Figure 1:
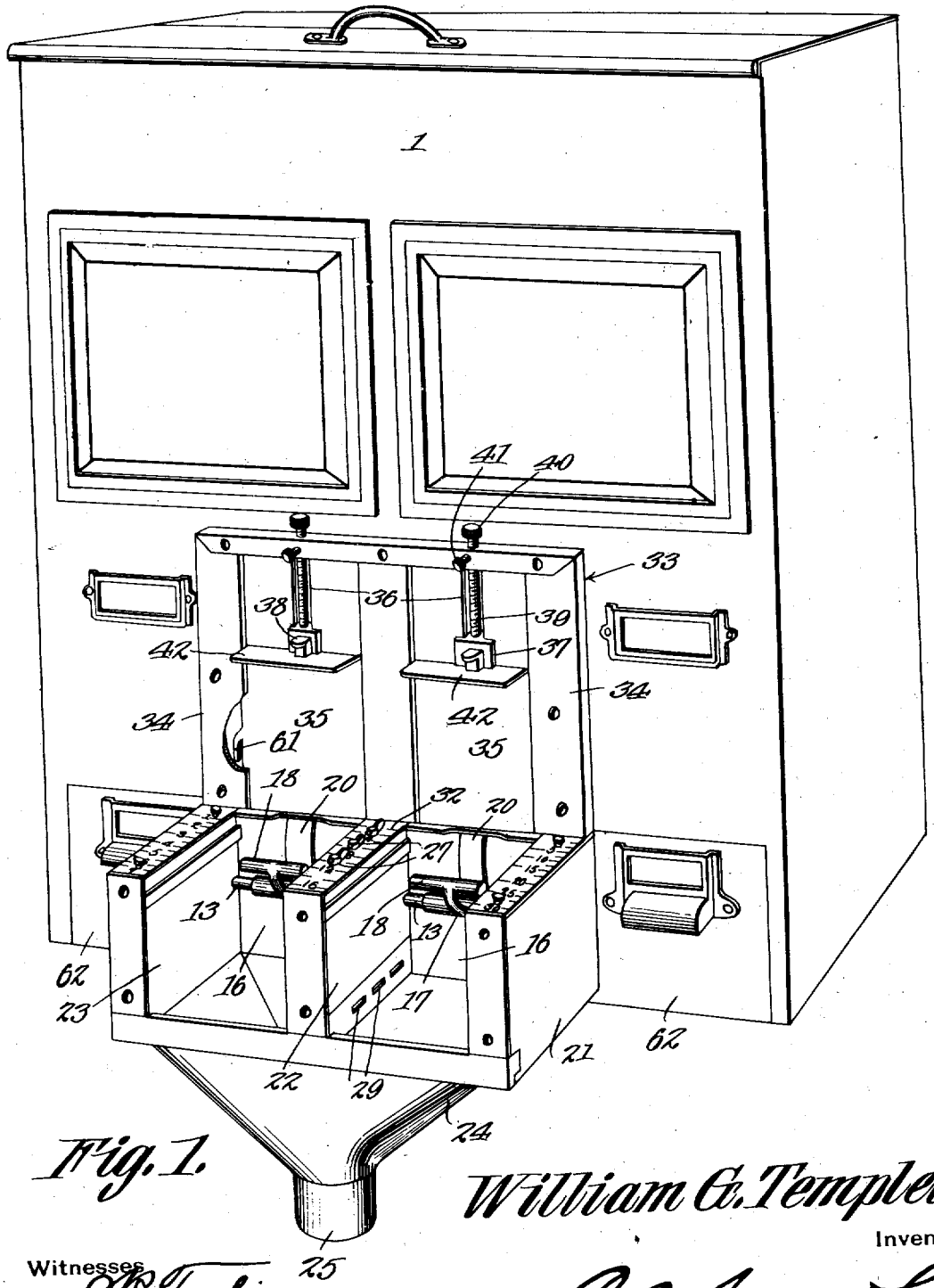

W. G. TEMPLETON.

DISPENSING BIN.

APPLICATION FILED APR. 14, 1914.

Reissued Aug. 31, 1915.

13,975.

4 SHEETS—SHEET 1.

William G. Templeton

Inventor,

Witnesses

J. P. Tomlin

S. G. Willson by C. A. Snow & Co.

Attorneys.

W. G. TEMPLETON.

DISPENSING BIN.

APPLICATION FILED APR. 14, 1914.

Reissued Aug. 31, 1915.

13,975.

4 SHEETS—SHEET 2.

William G. Templeton

Inventor, by C. A. Snow & Co.

Attorneys.

Witnesses

J. R. Tomlin

S. Willson.

W. G. TEMPLETON.

DISPENSING BIN.

APPLICATION FILED APR. 14, 1914.

Reissued Aug. 31, 1915.

13,975.

4 SHEETS—SHEET 3

William G. Templeton

Inventor, by C. A. Snow & Co.

Attorneys.

Witnesses

J. P. Tomey

G. Willrow

W. G. TEMPLETON.

DISPENSING BIN.

APPLICATION FILED APR. 14, 1914.

Reissued Aug. 31, 1915.

13,975.

4 SHEETS—SHEET 4.

William G. Templeton

Inventor,

Witnesses

J. P. Lomen

S. Willson by C. A. Snow & Co.

Attorneys.

UNITED STATES PATENT OFFICE.

WILLIAM G. TEMPLETON, OF COLORADO SPRINGS, COLORADO.

DISPENSING-BIN.

13,975. Specification of Reissued Letters Patent. Reissued Aug. 31, 1915.

Original No. 1,054,804, dated March 4, 1913, Serial No. 720,223. Application for reissue filed April 14, 1914. Serial No. 831,831.

*To all whom it may concern:*

Be it known that I, WILLIAM G. TEMPLETON, a citizen of the United States, residing at Colorado Springs, in the county of El Paso and State of Colorado, have invented a new and useful Dispensing-Bin, of which the following is a specification.

This invention relates to dispensing apparatus for granular materials, such as beans, coffee, rice, sugar, flour, etc.

One of the objects of the invention is to provide an apparatus of this type, the horizontally movable charge holder of which has a closure at its outer end provided with means whereby the same is opened automatically when said charge holder is moved to closed position, thus permitting the contents of the charge holder to be discharged through the opening thus provided and without necessitating any movement of the hand of the operator other than that necessary in pushing the charge holder.

Another object is to provide improved means for limiting the movement of the charge holder, said means being simple and efficient and, where a double or twin device is employed, being capable of movement into position to limit either of the charge holders while material is being dispensed or withdrawn.

Another object is the provision of the improved form of cut off stop, the adjusting means of which can be readily operated to effect a minute movement of the stop.

Another object is the provision of separate means for preventing short measure, one of these means being in the form of a governor for controlling the speed of movement of the charge holder during the delivery of material from the main receptacle or bulk holder, and the other one of said means being in the form of a lock for holding the charge holder against back or return movement until after the cut off has been completely closed.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawing the preferred form of the invention has been shown.

Figures 2, 6:
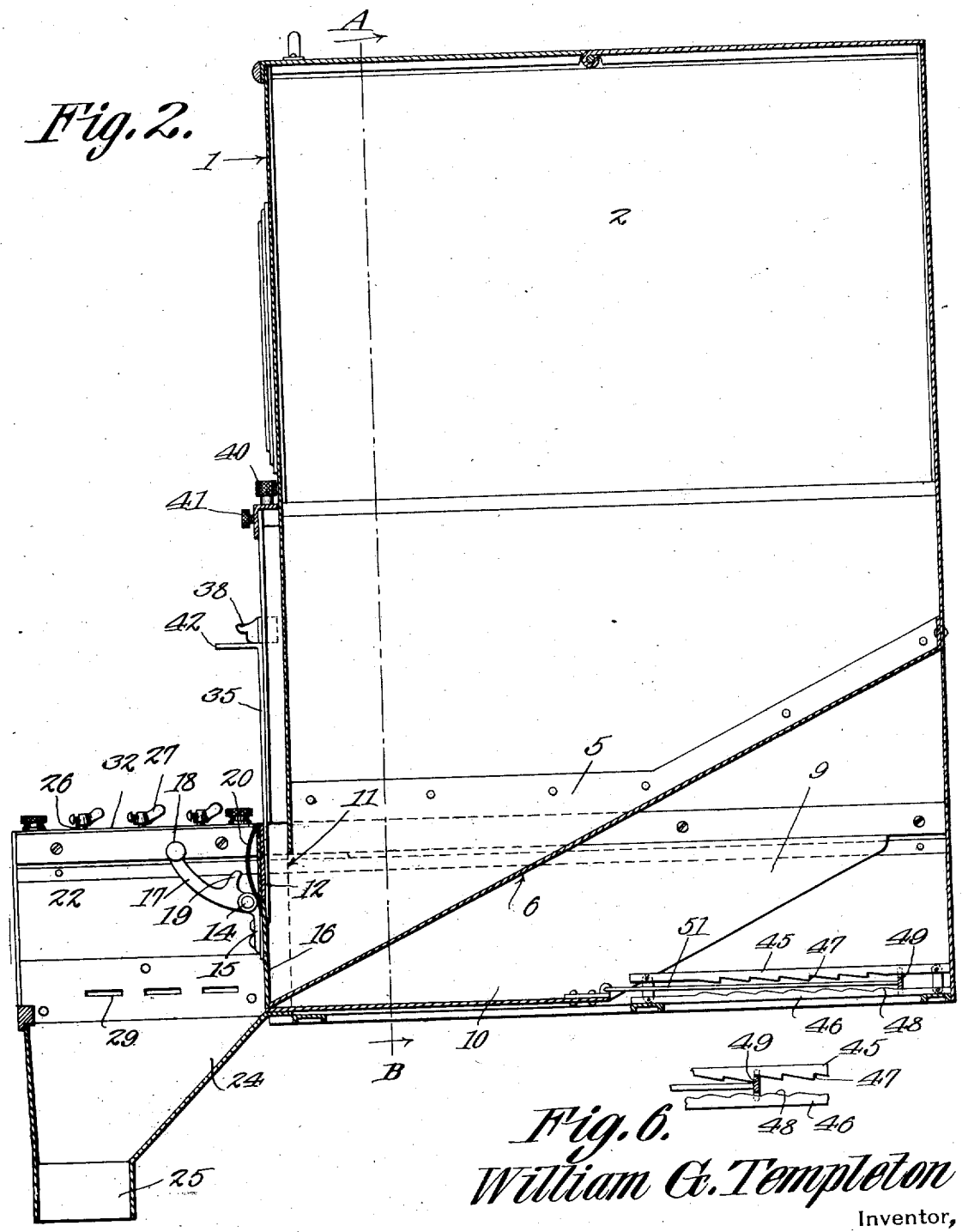
Figure 3:
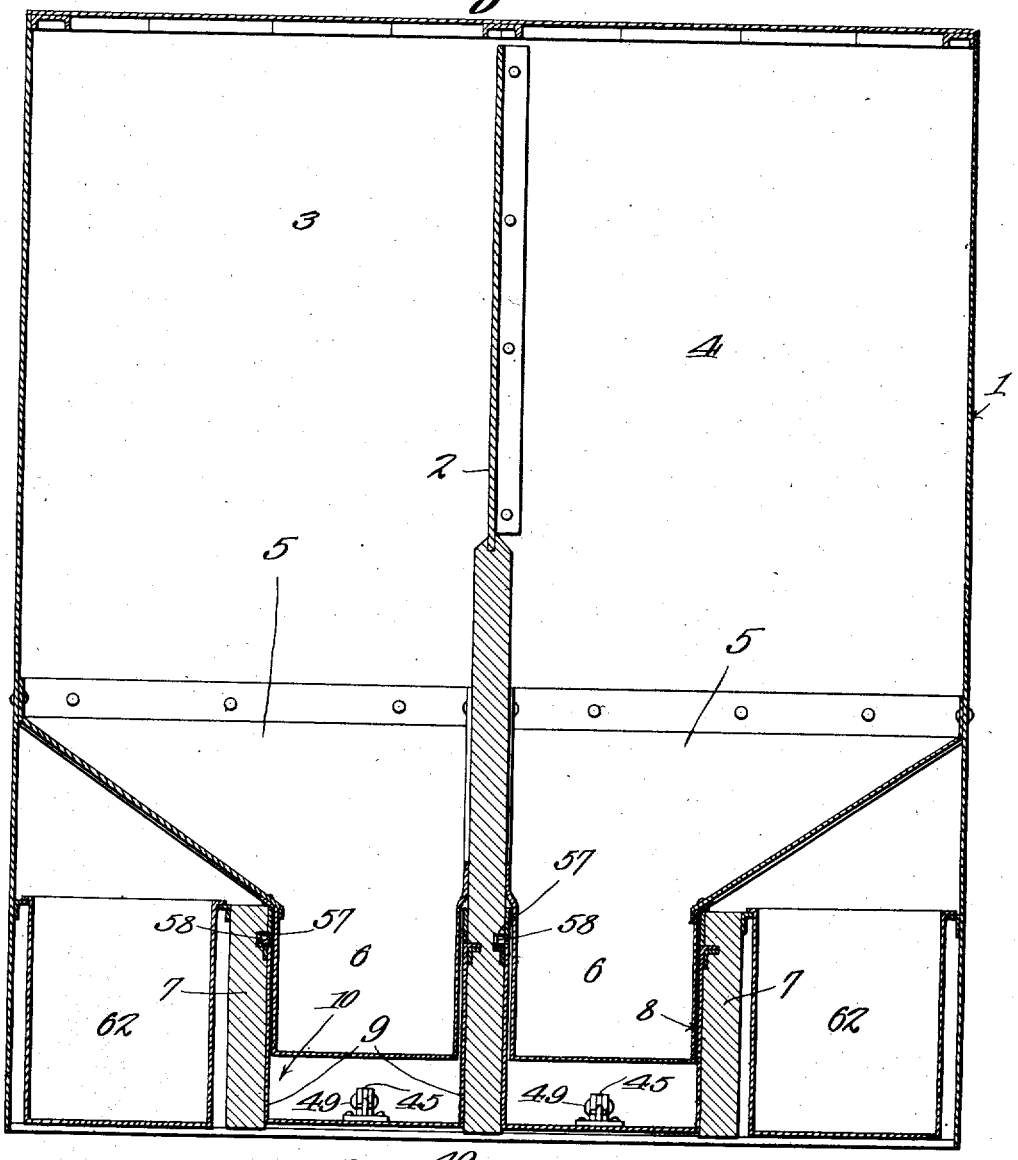
Figure 5:
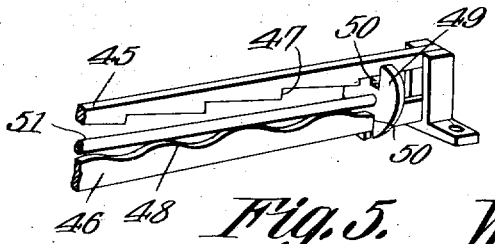
Figure 7:
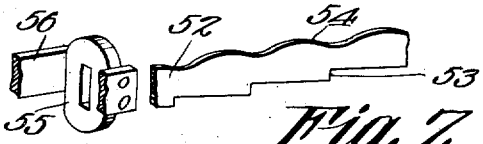
Figure 4:
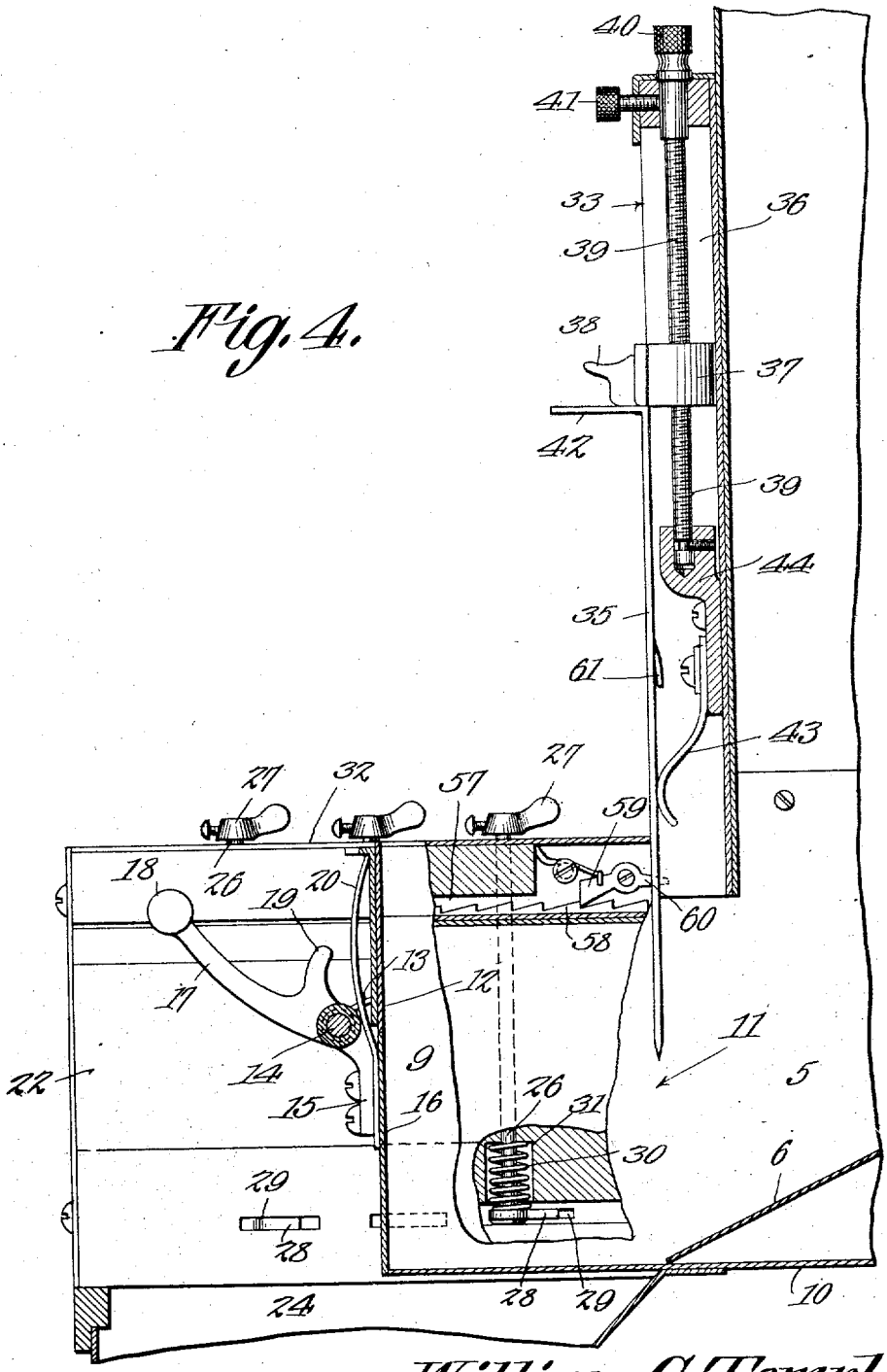

In said drawing:—Figure 1 is a perspective view of the apparatus; Fig. 2 is a vertical section therethrough taken from front to rear and longitudinally of one of the charge holders, said holder being shown in its normal or closed position; Fig. 3 is a section on the line A—B Fig. 2; Fig. 4 is a view partly in vertical section and partly in elevation through a portion of the apparatus showing in detail the adjustable cut off stop, the lock of the charge holder, and the stop for limiting the sliding movement of the charge holder; Fig. 5 is a detail view of a portion of the governor; Fig. 6 is a side elevation of the parts shown in Fig. 5 and showing the relative positions assumed thereby when an effort is made to pull out the charge holder at an excessive speed; Fig. 7 is a perspective view showing portions of a modified form of governor which may be used.

Referring to the figures by characters of reference, 1 designates the main receptacle or bulk holder which, obviously, can be of any proportions desired. In the form of device illustrated, the bulk holder is formed with an intermediate partition 2, and separate compartments 3 and 4 are thus formed, the bottom of each compartment being made up of a hopper-like section 5 which is secured at its upper edges to the walls of the compartment and has a downwardly and forwardly inclined bottom 6 suspended between the partition 2 and a supplemental partition 7 which is arranged in the receptacle 1 and below the bottom 5. This inclined portion 6 is spaced slightly from the partitions 2 and 7 so as to form passageways 8 designed to receive the side wings 9 of a trough-like charge holder 10, the forward end of the bottom 6 being adapted to rest upon the upper surface of the bottom of the charge holder, as will be apparent by referring to Figs. 2 and 4. An opening 11 is formed in the front of the receptacle 1 and extends throughout the height of the charge holder 10, said charge holder being fitted snugly within the opening. The rear end of the charge holder is open while the front end is provided with a cross strip 12 along the upper portion thereof. Brackets 13 extend outwardly from the side portions of the cross strip 12 close to the lower edge thereof and journaled within them is a pintle 14. An arm 15 extends downwardly from the pintle and is suitably connected to a closure plate or member 16 and another arm 17 extends upwardly and forwardly from the pintle and is provided with a handle 18. A stop finger 19 extends upwardly from this arm 17 and serves to limit upward swinging movement of the arm 17, and, consequently, the forward and upward movement of the closure plate 16. A leaf spring 20 is connected to the closure plate 16 and bears against the outer face of the cross plate 12 and serves normally to hold the closure 16 in shut position. This closure when shut bears against the front ends of the side wings 9 of the charge holder.

Extending forwardly from the lower portions of the partitions 2 and 7 are walls 21, 22 and 23 forming channels between them and within which channels the charge holders are adapted to move. A hopper 24 extends under the two channels and is designed to receive material therefrom, the said hopper being formed with an outlet tube or spout 25.

For the purpose of limiting the outward movement of each charge holder, the middle extension wall 22 is provided with a desired number of stop devices. Each of these includes a rod 26, the upper end of which projects above the upper face of the wall 22 and has a button 27 secured thereto. By means of this button the rod can be rotated readily. The stop finger 28 extends radially from the lower end of the rod 26 and when the rod is rotated, this finger is adapted to project through either of the two slots 29 formed in opposite sides of the wall 22. For example, when the button 27 is turned to the right, the finger 28 will swing through the slot 29 in the right side of the wall 22, while, should the button 27 be swung to the left, the finger 28 would be swung through the slot in the left side of the wall 22. The slots are so positioned relative to the fingers 28 that, when said fingers are projecting beyond the wall 22 and at right angles thereto, they will abut against the adjacent end walls of the slots, said end walls thus limiting the movement of the fingers. For the purpose of retarding rotation of each rod 26 a spring 30 may be mounted on the rod, this spring being seated in a counterbore 31 and bearing at one end against the finger 28 and at its other end against the inner or upper end of the counterbore.

The rods 26 may be arranged at any desired distances apart and the upper face of the wall 22 is preferably provided with a plate 32 having graduations thereon indicating fractions of a unit of measure. The rods 26 are so positioned that, when the fingers 28 are swung to active positions, they will bring the charge holders to a stop when brought opposite certain predetermined graduations on the strip 30.

Secured to that wall of the receptacle 1 through which the walls 21, 22 and 23 project, is a face member 33 having guides 34 thereon and extending upwardly from the upper faces of the walls 21, 22 and 23. Cut offs 35 are interposed between these guides and are engaged thereby, each cut off being so proportioned as to extend between and close to the wings of the charge holder thereunder. Channels 36 are arranged between and parallel with the guides 34 and slidably mounted in each channel is a block 37 having an outstanding stop projection 38 which is disposed in the path of the cut off thereunder. An adjusting screw 39 is arranged longitudinally within each channel 36 and extends through and engages the block 37 in said channel. A head 40 may be provided at the upper end of the screw 39 and by means thereof said screw can be rotated readily, so as to move the block 37 upwardly or downwardly within the channel 36 and thus lengthen or shorten the path of movement of the cut off under the block. A locking screw 41 may be arranged to engage the adjusting screw 39 so as to prevent rotation thereof after the block has been adjusted to a desired position. As shown in the drawing, each cut off 35 may be provided with a grip 42 whereby said cut off can be readily raised or lowered. This grip can be in the form of a flange, such as shown or can be of any other construction desired.

For the purpose of holding the cut off against movement, except when shifted forcibly, a leaf spring 43 or the like is mounted within the lower portion of each channel 36 and bears against the inner or back face of the cut off, as shown particularly in Fig. 4. Preferably this spring is secured to the lower bearing block 44 in which the adjusting screw 39 is journaled.

It is to be understood that when the cut off 35 is in lowermost position, it lies close to the front edge of the inclined bottom 6 and thus serves as a closure for the opening 11. The material contained within the receptacle 1 will of course completely fill hopper-like bottom 5 and will pack against the cut off 35. Moreover, the cut off stop 38 is so adjusted that, when the cut off 35 is raised against the stop 38, it will permit the charge holder to withdraw a charge of material, the bulk of which will be equal to the unit of measure indicated by that graduation on the strip 32 opposite which the cross strip 12 of the charge holder is brought to a stop. It is of course to be understood that the adjustment of the stop 38 will vary according to the material to be dispensed.

Assuming that the parts have been properly adjusted and that the bulk holder is partly or entirely filled, and it is desired to remove a predetermined quantity of material from the bulk holder, the operator pulls the cut off 35 upwardly against its stop 38. He then grasps the handle 18 and pulls the charge holder forwardly in the channel between the projecting walls. This movement is continued until the cross strip 12 is brought opposite the desired graduation on the strip 32. If said graduation registers with one of the rods 26, said rod can first be turned so as to project the finger 28 into the path of the charge holder and thereby limit the sliding movement of the charge holder. During outward movement of the charge holder, a charge of material is withdrawn from the bulk holder and under the elevated cut off 35, this charge being of uniform depth. Upon the completion of the outward movement of the charge holder, the cut off 35 is moved downwardly so as to come into contact with the bottom of the charge holder. The operator then pushes backwardly against the handle 18. During the first portion of this movement, the pintle 14 is rotated and causes the closure 16 to swing forwardly and upwardly until the stop finger 19 comes against the spring 20. By continuing to push upon the handle 18, the charge holder will slide back into position within the receptacle 1. As the charge of material contained within the charge holder is prevented by the cut off from moving back with the charge holder, it will be apparent that said material is ejected through the opening formed under the raised closure 16 and will thus fall into the hopper 24. If a bag is held with its open end about the spout 25 this discharged material will fall thereinto. As soon as the handle 18 is released, after the cross strip 12 has been brought into contact with the lower part of cutoff 35, the spring 20 will return the closure 16 to its normal or closed position.

As heretofore stated, one of the objects of the invention is to provide means whereby a merchant is prevented from giving short measure. Unless some such means is utilized, it would be possible, by pulling the charge holder forward very rapidly, to obtain within the charge holder a charge of material which would not be of uniform thickness and which would therefore be underweight. Furthermore, without the provision of some protecting means, it would be possible for a merchant to push the charge holder inwardly to a slight extent before lowering the cut off. This would likewise result in short measure. For the purpose of preventing manipulation of the apparatus so as to give short measure, a novel form of governor has been provided for retarding the outward sliding movement of the charge holder and a lock has been employed for preventing the charge holder from moving back to its normal position until the cut off has been lowered.

The governing means includes parallel upper and lower bars 45 and 46, these two bars being arranged back of and parallel with the path of movement of the charge holder. The upper bar 45 has ratchet teeth 47 on its lower face and the lower bar 46 has rounded teeth 48 on its upper face. The teeth 47 and 48 are oppositely disposed, the lower teeth 48 being rounded as shown. The plate 49 is mounted to slide between the bars 45 and 46, and has upper and lower slots 50 in which the bars are seated. A rod 51 connects the plate 49 with the charge holder 10. It will be seen that when the charge holder is pulled forward the plate 49 will ride easily over the lower rounded teeth 48 and will pass under the teeth 47 without engaging them. When, however, the charge holder is pulled forward at an excessive speed, the plate 49 in riding over the rounded teeth 48 will be thrown upwardly thereby into engagement with one of the upper teeth 47, which will thus stop the forward movement of the plate 49 and the charge holder 10. This upward movement of the plate 49 is permitted in view of the fact that the rod 51 is resilient. Instead of utilizing an upper and a lower toothed bar, as shown in Figs. 2 and 5, a single bar 52 may be employed, the lower edge of this bar being provided with angular ratchet teeth 53, while the upper edge thereof is provided with rounded teeth 54. A sleeve 55 is adapted to slide upon this bar and normally to bear downward on the rounded teeth 54. This sleeve may be connected to the charge holder in any suitable manner, as by means of one or more connecting strips 56 and it will be apparent that, should the charge holder be pulled out at an excessive speed, the rounded upper teeth would throw the sleeve 55 upwardly, a sufficient distance to cause it to engage one of the angular teeth 53. This, obviously, would bring the sleeve 55 and the charge holder to a stop.

For the purpose of locking the charge holder against backward or return movement until after the cut off has been lowered, a groove 57 is formed in one of the partitions and extension walls adjacent each charge holder and the adjacent side wing 9 of the charge holder is projected laterally into said groove and provided with a series of ratchet teeth 58. This construction has been illustrated in Figs. 3 and 4. Spring pressed pawl 59 is arranged above and adapted to engage said ratchet teeth, and, when the charge holder is drawn outward from the bulk holder, these ratchet teeth will slip under the pawl. The pawl has a finger 60 which extends to one side of the cut off 35 and a projection 61 extends laterally from the cut off and is adapted, when said cut off is moved downwardly, to its lowermost position, to move against finger 60 and thus lift the pawl 59 out of engagement with the tooth 58 thereunder. Thus it will be seen that, as long as the cut off is raised, it is impossible to push the charge holder back into the bulk holder unless the cut off is first completely lowered so as to cause the projection 61 to shift the pawl 59 out of engaging position.

As shown in the drawing, the spaces beyond the supplemental partitions 7 can be utilized by mounting drawers 62 therein.

What is claimed is:—

1. A dispensing apparatus having a discharge opening, a receptacle in communication with said discharge opening, said receptacle being movable to and from the discharge opening to vary the receiving portion of the receptacle, a vertically movable trimmer disposed to regulate the depth of material discharged through the opening, and means carried by the trough to permit the emptying of the trough when said regulating means is in closed position and the trough is moved inwardly.

2. In a dispensing device, a hopper for the bulk, a horizontally disposed trough movable to and from the hopper, the lowest portion of the hopper and the bottom of the trough being in substantially the same plane, a vertically movable means for closing the hopper and for regulating the level of the material fed from the hopper into the trough as the trough is moved outwardly, and means carried by the trough to permit the emptying of the trough when said regulating means is in closed position and the trough is moved inwardly.

3. In a dispensing device, a hopper for the bulk, a horizontally disposed trough movable to and from the hopper, the lowest portion of the hopper and the bottom of the trough being in substantially the same plane, slidable means for regulating the level of the material fed from the hopper into the trough, and means carried by the trough permitting the emptying of the trough when said regulating means is in its lowermost position and the trough is moved inwardly.

4. In a dispensing device, a hopper for the bulk, a horizontally disposed trough movable to and from the hopper, the lowest portion of the hopper and the bottom of the trough being in substantially the same plane, adjustable means for regulating the level of the material fed from the hopper into the trough, and means carried by the trough permitting the emptying of the trough when said regulating means is in its lowermost position and the trough is moved inwardly.

5. In a dispensing device, a hopper for the bulk having an outlet, a horizontally disposed slidable trough movable to and from the hopper and provided with a discharge opening at its forward end, a vertically slidable plate disposed at the front of the hopper to regulate the height of the outlet of the hopper and the level of the material within the trough, and a pivoted closure carried by the trough to control the discharge opening of the trough, whereby as the trough is pushed inwardly the hopper being closed, the contents of the trough will be emptied through the discharge opening of the trough.

6. In a dispensing device, a hopper for the bulk having an outlet, a horizontally slidable trough movable to and from the hopper and provided with a discharge opening at its forward end, a vertically slidable plate disposed at the front of the hopper to regulate the height of the outlet of the hopper and the level of the material within the trough, a pivoted closure carried by the trough to control the discharge opening of the trough, whereby as the trough is pushed inwardly the hopper being closed, the contents of the trough will be emptied through the discharge opening of the trough, and adjustable means for regulating the movement of the slidable plate.

7. In a dispensing bin, a plurality of hoppers, a plurality of walls projecting forwardly from the hoppers, a trough to each hopper having its bottom in substantially the same plane as the lowermost portion of its hopper, each trough being capable of movements to and from the hopper and between two of the projecting walls, a graduated scale carried by each projecting wall and coöperating with the adjacent trough to indicate the amount within the trough, and means disposed adjacent the forward wall of each hopper and vertically slidable with relation to the bottom of the trough to control the flow of material from the hopper and the level thereof within the trough.

8. In a dispensing bin, a plurality of hoppers, a plurality of walls projecting forwardly from the hoppers, a trough to each hopper having its bottom in substantially the same plane as the lowermost portion of its hopper, each trough being capable of movements to and from the hopper and between two of the projecting walls, a graduated scale carried by each projecting wall and coöperating with the adjacent trough to indicate the amount contained therein, means disposed adjacent the forward wall of each hopper and vertically slidable with relation to the bottom of the trough to control the flow of material from the hopper and the level thereof within the trough, and a discharge spout into which both troughs discharge.

9. In a dispensing bin, a plurality of hoppers, a plurality of walls projecting forwardly from the hoppers, a trough to each hopper having its bottom in substantially the same plane as the lowermost portion of its hopper, each trough being capable of movements to and from the hopper and between two of the projecting walls, a graduated scale carried by each projecting wall and coöperating with the adjacent trough to indicate the amount contained therein, means disposed adjacent the forward wall of each hopper and vertically slidable with relation to the bottom of the trough to control the flow of material from the hopper and the level thereof within the trough, and means for regulating the distance of movement of the vertically slidable means.

10. In a dispensing bin, a plurality of hoppers, a plurality of walls projecting forwardly from the hoppers, a trough to each hopper having its bottom in substantially the same plane as the lowermost portion of its hopper, each trough being capable of movements to and from the hopper and between two of the projecting walls, a graduated scale carried by each projecting wall and coöperating with the adjacent trough to indicate the amount contained therein, means disposed adjacent the forward wall of each hopper and vertically slidable with relation to the bottom of the trough to control the flow of material from the hopper and the level thereof within the trough, a discharge spout into which both troughs discharge, and means for regulating the distance of movement of the vertically slidable means.

11. In a dispensing bin, a plurality of hoppers, a plurality of walls projecting forwardly from the hoppers, a trough to each hopper having its bottom in substantially the same plane as the lowermost portion of its hopper, each trough being capable of movements to and from the hopper and between two of the projecting walls, a graduated scale carried by each projecting wall and coöperating with the adjacent trough to indicate the amount contained therein, means disposed adjacent the forward wall of each hopper and vertically slidable to the bottom of the trough to control the flow of material from the hopper and the level thereof within the trough, and a pivoted closure at the forward end of each trough to control the flow of material from the trough.

12. In a dispensing bin, a plurality of hoppers, a plurality of walls projecting forwardly from the hoppers, a trough to each hopper having its bottom in substantially the same plane as the lowermost portion of its hopper, each trough being capable of movements to and from the hopper and between two of said projecting walls, a graduated scale carried by each projecting wall and coöperating with the adjacent trough to indicate the amount contained therein, means disposed adjacent the forward wall of each hopper and vertically slidable to the bottom of the trough to control the flow of material from the hopper and the level thereof within the trough, a pivoted closure at the forward end of each trough to control the flow of material from the trough, and a handle for controlling the pivoted closure to permit the same to be opened by the material as the trough is pushed inwardly.

13. In a dispensing bin, a plurality of hoppers, a plurality of walls projecting forwardly from the hoppers, a trough to each hopper having its bottom in substantially the same plane as the lowermost portion of its hopper, each trough being capable of movements to and from the hopper and between two of said projecting walls, a graduated scale carried by each projecting wall and coöperating with the adjacent trough to indicate the amount contained therein, means disposed adjacent the forward wall of each hopper and vertically slidable to the bottom of the trough to control the flow of material from the hopper and the level thereof within the trough, a pivoted closure at the forward end of each trough to control the flow of material from the trough, and a discharge spout into which both troughs discharge.

14. In a dispensing bin, a plurality of hoppers, a plurality of walls projecting forwardly from the hoppers, a trough to each hopper having its bottom in substantially the same plane as the lowermost portion of its hopper, each trough being capable of movements to and from the hopper and between two of said projecting walls, a graduated scale carried by each projecting wall and coöperating with the adjacent trough to indicate the amount contained therein, means disposed adjacent the forward wall of each hopper and vertically slidable to the bottom of the trough to control the flow of material from the hopper and the level thereof within the trough, a pivoted closure at the forward end of each trough to control the flow of material from the trough, and means for regulating the distance of movement of the vertically slidable means.

15. In a dispensing bin, a plurality of hoppers, a plurality of walls projecting forwardly from the hoppers, a trough to each hopper having its bottom in substantially the same plane as the lowermost portion of its hopper, each trough being capable of movements to and from the hopper and between two of said projecting walls, a graduated scale carried by each projecting wall and coöperating with the adjacent trough to indicate the amount contained therein, means disposed adjacent the forward wall of each hopper and vertically slidable to the bottom of the trough to control the flow of material from the hopper and the level thereof within the trough, a pivoted closure at the forward end of each trough to control the flow of material from the trough, a discharge spout into which both troughs discharge, and means for regulating the distance of movement of the vertically slidable means.

16. In a dispensing device, a plurality of hoppers, a plurality of walls projecting forwardly therefrom, a trough to each hopper having its bottom in substantially the same plane as the lowermost portion of its hopper, each trough being capable of movements to and from the hopper and between two of said projecting walls, a graduated scale carried by each projecting wall and cooperating with the adjacent trough to indicate the amount contained therein, a plate for each trough disposed adjacent the forward wall of each hopper and vertically slidable with relation to the bottom of its trough to control the flow of material from the hopper and the level thereof within its trough, said plate being substantially the same width as the interior of its trough, and a discharge spout into which both troughs discharge.

17. In a dispensing apparatus for granular material, a bulk-holder, a horizontally movable charge holder for progressively drawing a charge from the bulk-holder, a cut-off movable in a vertical plane and operable in any position of the charge holder for separating the material in the charge holder from the material in the bulk-holder, and means including said cut-off for emptying the charge holder.

18. In a dispensing apparatus for granular material, a bulk-holder having an outlet, a horizontally slidable charge holder adapted progressively to receive material flowing from said outlet, and means movable transversely of the charge holder for cutting off the flow of material from said outlet from any point in the movement of said charge holder, and means including said cut-off for discharging material from said charge holder.

19. In a dispensing apparatus, a bulk-holder having an outlet and provided with a downwardly inclined bottom, and a horizontal charge holder having its bottom located below the lower edge of said inclined bottom, said inclined bottom being disposed adjacent the front end of the charge holder when said charge holder is in closed position, whereby the charge holder is automatically filled as it is drawn forward.

20. In a dispensing apparatus, a bulk-holder, a movable charge holder, means for cutting off the charge from the material in the bulk-holder and constituting an abutment for the charge during the movement of the charge holder in one direction, and means for permitting discharge of the charge during such movement of the charge holder.

21. In a dispensing apparatus, a bulk-holder, a movable charge holder, means for withdrawing the charge holder from the bulk-holder, a cut-off for separating a charge from the material in the bulk-holder and constituting an abutment for the charge during the return of the charge holder to its housed position, and means controlled by said withdrawing means for permitting discharge of the charge during said return movement of the charge holder.

22. In a dispensing apparatus, a bulk-holder, a slidable charge holder, the bottom of the bulk-holder extending into the charge holder, and close to the sides and bottom thereof, there being an outlet opening in the bulk-holder through which the material is directed by said bottom of the bulk-holder.

23. In a dispensing apparatus, a bulk-holder, a slidable charge holder, the bottom of the bulk-holder extending into the charge holder, and close to the sides and bottom thereof, there being an outlet opening in the bulk-holder through which the material is directed by said bottom of the bulk-holder, and a cut-off constituting a closure for said opening for separating the material in the bulk-holder from the charge in the charge holder.

24. In a dispensing apparatus, a bulk-holder, a movable charge holder, means for cutting off the charge from the material in the bulk-holder and constituting an abutment for the charge during the movement of the charge holder in one direction, and means operated by the pressure exerted in effecting such movement, for releasing the contents of the charge holder.

25. In a dispensing apparatus, a bulk holder, a movable charge holder, means for withdrawing the charge holder from the bulk holder, a cut off for separating the charge from the material in the bulk holder and constituting an abutment for the charge during the return of the charge holder to its housed position, and means operated by the pressure exerted upon said withdrawing means in effecting the return movement of the charge holder, for releasing the charge during said return movement.

26. In a dispensing apparatus, a bulk holder, a charge holder, a normally shut closure upon the charge holder, and means operated during the movement of the charge holder to housed position, for opening the closure.

27. In a dispensing apparatus, a bulk holder, a charge holder, a normally shut closure upon the charge holder, a cut off for separating the charge in the holder from the material in the bulk holder, and a handle for shifting the front end of the charge holder toward or from the cut off, said handle constituting means during its movement toward the cut off for opening the closure.

28. In a dispensing apparatus, a bulk holder, a charge holder having a normally shut closure, a cut off for separating the charge from the material in the bulk holder, and means for shifting the charge holder out of and into the bulk holder, said means being adapted to open the closure during the movement of the charge holder into the bulk holder.

29. In a dispensing apparatus, a bulk holder, a charge holder having a closure, and means for shifting the charge holder into and out of the bulk holder, said means being adapted to open the closure during the movement of the charge holder into the bulk holder.

30. In a dispensing apparatus, a bulk holder, a slidable charge holder having a closure at one end, a cut off for separating the charge from the material in the bulk holder, and a handle connected to the closure for sliding the charge holder into and out of the bulk holder, said handle constituting means for opening the closure during the movement of the charge holder into the bulk holder.

31. In a dispensing apparatus, a bulk holder, a charge holder, a normally shut closure at the outer end of the charge holder, a cut off for separating the charge from the material in the bulk holder, a handle connected to the closure for sliding the charge holder into and out of the bulk holder, said handle constituting means for opening the closure during the movement of the charge holder into the bulk holder, and means for limiting the movement of the handle relative to the charge holder.

32. In a dispensing apparatus, a bulk holder, a charge holder slidable into and out of the bulk holder, a stop device, and means for shifting said device into and out of the path of the charge holder.

33. In a dispensing apparatus, bulk holders, charge holders mounted to slide into and out of the respective bulk holders, a stop device interposed between the paths of the charge holders, and means for shifting said device into the paths of either of said charge holders.

34. In a dispensing apparatus, a bulk holder, a charge holder slidably mounted therein, a cut off for separating the charge from the material in the bulk holder, a stop in the path of the cut off, and an adjusting screw engaging the stop.

35. In a dispensing apparatus, a bulk holder, a charge holder, a cut off for separating the charge from the material in the bulk holder, a stop element, a guide therefor, an adjusting screw engaging said element, and means for locking the screw against rotation.

36. In a dispensing apparatus, a bulk holder, a charge holder, a cut off for separating the charge from the material in the bulk holder, a stop element slidably mounted in the path of the cut off, means for holding said element against rotation, and an adjusting screw extending from said element for shifting it relative to the cut off.

37. In a dispensing apparatus, a bulk holder, a charge holder, a cut off for separating the charge from the material in the bulk holder, a stop element slidably mounted in the path of the cut off, means for holding said element against rotation, an adjusting screw extending from said element for shifting it relative to the cut off, and means for locking the adjusting screw against rotation.

38. In a dispensing apparatus, a bulk holder, a charge holder, a face member secured upon the bulk holder and above the charge holder, a cut off slidably engaging the face member for separating the charge from the material in the bulk holder, there being a channel within the face member, a stop element slidably mounted in the channel and in the path of the cut off, and an adjusting screw in the channel and engaging the stop element.

39. In a dispensing apparatus, a bulk holder, a charge holder, a face member secured upon the bulk holder and above the charge holder, a cut off slidably engaging the face member for separating the charge from the material in the bulk holder, there being a channel within the face member, a stop element slidably mounted in the channel and in the path of the cut off, and an adjusting screw in the channel and engaging the stop element, said screw being held against longitudinal movement, and means holding said screw against rotation.

40. In a dispensing apparatus, a bulk holder, a reciprocatory charge holder, and means for controlling the speed of movement of the charge holder.

41. In a dispensing apparatus, a bulk holder, a movable charge holder, and means for bringing the charge holder automatically to a stop when exceeding a predetermined speed.

42. In a dispensing apparatus, a bulk holder, a charge holder slidable relative thereto, a toothed element, a member movable with the charge holder and close to but out of engagement with the toothed element, and means constantly engaged by said member for shifting it automatically into engagement with said toothed element when the member and charge holder move at more than a predetermined speed.

43. In a dispensing apparatus, a bulk holder, a charge holder, movable relative thereto, a member movable with the charge holder, stop teeth close to but normally out of engagement with said member, and means constantly engaged by the member for shifting it automatically into engagement with one of the teeth when the member and charge holder are moved in excess of a predetermined speed.

44. In a dispensing apparatus, a bulk holder, a movable charge holder, means for holding the charge holder against movement in one direction relatively to the bulk holder, a cut off for separating the charge from the material in the bulk holder, and means carried by the cut off for releasing the charge holder when the cut off is in a predetermined position.

45. In a dispensing apparatus, a bulk holder, a charge holder movable relatively thereto, means for holding the charge holder against movement in one direction, a cut off normally separating the charge from the material in the bulk holder, and means upon the cut off for relasing the charge holder when the cut off is brought to normal position.

46. In a dispensing apparatus, a bulk holder, a movable charge holder, ratchet teeth carried by the charge holder, a pawl normally engaging the ratchet teeth to hold the charge holder against movement in one direction, a cut off normally separating the charge from the material in the bulk holder, and means upon the cut off for disengaging the pawl from the ratchet teeth when the cut off is brought into normal position.

47. In a dispensing apparatus, a bulk holder, a charge holder slidable relative thereto, means for locking the charge holder against movement in one direction, a cut off, and means controlled by the cut off for unlocking the charge holder.

In testimony that I claim the foregoing as my own, I have hereto affixed my signature in the presence of two witnesses.

WILLIAM G. TEMPLETON.

Witnesses:

JASPER H. SANFORD,

F. J. BAKER.